United States Patent
Hsieh et al.

(10) Patent No.: US 11,037,124 B1
(45) Date of Patent: Jun. 15, 2021

(54) CHECKOUT APPARATUS FOR BARCODELESS MERCHANDISE

(71) Applicant: Viscovery Inc., Taipei (TW)

(72) Inventors: Shao-Hang Hsieh, Taipei (TW); Po-Hsiang Chen, Taipei (TW); Chia-Tsen Sun, Taipei (TW); Yu-Tai Hung, Taipei (TW); Peng-Cheng Chen, Taipei (TW)

(73) Assignee: VISCOVERY INC., Taipei (TW)

( * ) Notice: Subject to any disclaimer, the term of this patent is extended or adjusted under 35 U.S.C. 154(b) by 0 days.

(21) Appl. No.: 16/802,549

(22) Filed: Feb. 26, 2020

(51) Int. Cl.
| | |
|---|---|
| *G06Q 20/20* | (2012.01) |
| *G06K 9/00* | (2006.01) |
| *G07G 1/00* | (2006.01) |
| *G07G 1/14* | (2006.01) |
| *G06T 13/40* | (2011.01) |
| *G06F 13/40* | (2006.01) |

(52) U.S. Cl.
CPC ....... *G06Q 20/208* (2013.01); *G06K 9/00671* (2013.01); *G07G 1/0036* (2013.01); *G07G 1/145* (2013.01); *G06F 13/4081* (2013.01); *G06K 2209/17* (2013.01)

(58) Field of Classification Search
CPC ............. G06K 2209/17; G06K 7/1096; G07G 1/0036; G07G 1/0054; G07G 1/0063; G07G 1/12; G07G 1/145; G06Q 20/208
USPC ............................................ 235/383; 705/23
See application file for complete search history.

(56) References Cited

U.S. PATENT DOCUMENTS

| | | | | |
|---|---|---|---|---|
| 5,665,955 A | * | 9/1997 | Collins, Jr. .............. | G06K 7/10 235/383 |
| 2012/0074218 A1 | * | 3/2012 | Walsh .................. | G07G 1/0054 235/380 |
| 2016/0019514 A1 | | 1/2016 | Landers, Jr. et al. | |
| 2017/0346984 A1 | * | 11/2017 | Yajima ................. | H04N 1/0288 |
| 2018/0017517 A1 | * | 1/2018 | Werner ............. | G01N 21/8483 |
| 2018/0075711 A1 | * | 3/2018 | Takeno ............. | G06K 9/00671 |

(Continued)

FOREIGN PATENT DOCUMENTS

| | | |
|---|---|---|
| CN | 102855713 A | 1/2013 |
| CN | 109118200 A | 1/2019 |

(Continued)

OTHER PUBLICATIONS

Office Action dated Oct. 29, 2020 of the corresponding Taiwan patent application No. 109102230.

*Primary Examiner* — Suezu Ellis
(74) *Attorney, Agent, or Firm* — Chun-Ming Shih; HDLS IPR SERVICES (57) ABSTRACT

A checkout apparatus for barcodeless merchandise, the checkout apparatus includes an image camera module and a control module coupled to the image camera module. The image camera module obtains a merchandise image includes the barcodeless merchandise. The control module receives the merchandise image and generates an output datum according to a result of a merchandise identification program after the control module performs the merchandise identification program on the merchandise image. At least one of the image camera module and the control module is coupled to the point of sales (POS) management system or is embedded in the POS management system, the output datum is readable for the POS management system.

13 Claims, 6 Drawing Sheets

(56) References Cited

U.S. PATENT DOCUMENTS

2019/0026718 A1* 1/2019 Iizaka .................. G07G 1/0054
2020/0054153 A1* 2/2020 Naito .................... G07G 1/0009

FOREIGN PATENT DOCUMENTS

TW    M560077 U    5/2018
TW    M594208 U    4/2020

* cited by examiner

CHECKOUT APPARATUS FOR BARCODELESS MERCHANDISE

BACKGROUND

Technical Field

The present disclosure relates to a checkout apparatus, and more particularly to a checkout apparatus for electronically and automatically checkout barcodeless merchandise.

Description of Related Art

The statements in this section merely provide background information related to the present disclosure and do not necessarily constitute prior art.

Point of sale (POS) management system, also known as point of service management system or POS system, uses computer's functions of statistics, registration and data transmission to collect real-time information for sales of merchandise and to establish a digital management system. That is, using a digital management to automatically control sales situation of each item, so as to achieve a purpose of convenient to managing marketing strategies. The POS management system may be composed of a host computer and a terminal controlled by a sub-computer of a store. It uses an identification device such as an optical bar code scanner to replace traditional single function cash register to achieve a purpose of combining front-end operations and back-end operations. In addition, the POS management system can quickly and accurately calculate a payment of merchandise, and can collect data changes such as sales, purchases, and stock by category to provide sales analysis management, procurement policies, order processing and orders from suppliers or logistics centers to the company's decision-making department. To achieve a purpose of convenient to managing marketing strategies of a company.

The POS management system mainly uses a barcode to provide a fast checkout method, and its automatic operation mode can reduce errors caused by manual key-in prices of merchandise by store employees, and can even develop into an unattended automated store. However, traditional POS management systems cannot be used for barcodeless merchandise that is not suitable for bar code checkout or that promote eco-friendly to reduce packaging, and operations of manual key-in and manual checkout must still be performed. It is easy to cause errors by manual key-in prices of merchandise, it may increase operating costs, and may even affect correctness of the company's marketing strategy.

Therefore, how to design a checkout apparatus for barcodeless merchandise to solve the technical problems above is an important subject studied by the inventors and proposed in the present disclosure.

SUMMARY

A first purpose of the present disclosure is to provide a checkout apparatus for barcodeless merchandise, which can automatically perform operations of key-in and checkout for barcodeless merchandise, so as to achieve a purpose of reducing errors caused by manual operation for barcodeless merchandise at checkout terminals, reducing operating costs, and maintaining a correctness of marketing strategy of a company.

In order to achieve the first purpose above-mentioned, the checkout apparatus is coupled to a point of sales (POS) management system and includes an image camera module and a control module coupled to the image camera module. The image camera module obtains a merchandise image included barcodeless merchandise, the control module receives the merchandise image and generates an output datum to the POS management system according to a result of a merchandise identification program after the control module performs the merchandise identification program on the merchandise image. At least one of the image camera module and the control module is coupled to the POS management system or is embedded in the POS management system, the output datum is readable for the POS management system.

Further, the image camera module obtains the merchandise image by taking a picture, and the control module includes a first microcontroller module and a second microcontroller module; the first microcontroller module is coupled to the image camera module, the first microcontroller module generates a metadatum according the result of the merchandise identification program after the first microcontroller module performs the merchandise identification program on the merchandise image; the second microcontroller module is coupled to the first microcontroller module and converts the metadatum into the output datum.

Further, the metadatum includes a merchandise label, a merchandise name, a merchandise category, or the number of merchandises.

Further, the first microcontroller module is a single chip computer based on a Linux operating system architecture, the first microcontroller module performs the merchandise identification program on the merchandise image according to an appearance of the barcodeless merchandise of the merchandise image.

Further, the second microcontroller module is a circuit board based on an Arduino machine code architecture.

Further, the checkout apparatus for barcodeless merchandise includes a display unit coupled to the control module for displaying the merchandise image obtained by the image camera module and displaying the metadatum or the output datum generated by the control module.

Further, the checkout apparatus for barcodeless merchandise includes an image identification database coupled to the control module, and the image identification database for the control module to access during the control module performs the merchandise identification program on the merchandise image.

Further, the controller includes a USB port, and the control module is hot-swappable to the POS management system through the USB port.

Further, the checkout apparatus for barcodeless merchandise includes a starting unit coupled to the control module for controlling to start or stop the image camera module by the control module.

Further, the checkout apparatus for barcodeless merchandise includes a bracket supporting the image camera module.

Further, the checkout apparatus for barcodeless merchandise includes an assistant exposure module arranged on a surface of the image camera module or the bracket that facing the barcodeless merchandise.

Further, the checkout apparatus for barcodeless merchandise includes a scanner port for coupling a scanner and transferring data obtained by the scanner to the POS management system.

When the checkout apparatus for barcodeless merchandise of the present disclosure is used, one or more barcodeless merchandise can be scanned or sensed by the image camera module to obtain the merchandise image included the barcodeless merchandise. And then, after the control module performs the merchandise identification program on the merchandise image, the control module generates the output datum to the POS management system according to the result of the merchandise identification program. At least one of the image camera module and the control module is coupled to the POS management system or is embedded in the POS management system. The output datum is readable for the POS management system. That is, the output datum can be compatible with the POS management system, the POS management system can directly read the output datum, and the merchandise identification program may identify the merchandise label, the merchandise name, the merchandise category, or the number of merchandises. For this reason, under a condition of combining the image camera module, the control module and the POS management system, which can automatically perform operations of key-in and checkout for barcodeless merchandise, so as to achieve the purpose of reducing errors caused by manual operation for barcodeless merchandise at checkout terminals, reducing operating costs, and maintaining a correctness of marketing strategy of a company.

A second purpose of the present disclosure is to provide a checkout system for barcodeless merchandise, which can automatically perform operations of key-in and checkout for barcodeless merchandise, so as to achieve a purpose of reducing errors caused by manual operation for barcodeless merchandise at checkout terminals, reducing operating costs, and maintaining the correctness of marketing strategy of the company.

In order to achieve the second purpose above-mentioned, the checkout system includes a point of sales (POS) management system, an image camera module and a control module coupled to the image camera module. The image camera module obtains a merchandise image included barcodeless merchandise. The control module receives the merchandise image and generates an output datum to the POS management system according to a result of a merchandise identification program after the control module performs the merchandise identification program on the merchandise image. At least one of the image camera module and the control module is coupled to the POS management system or is embedded in the POS management system, the output datum is readable for the POS management system.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The embodiments of the present disclosure are described by way of specific examples, and those skilled in the art can readily appreciate the other advantages and functions of the present disclosure. The present disclosure may be embodied or applied in various other specific embodiments, and various modifications and changes can be made without departing from the spirit and scope of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that can be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 1:
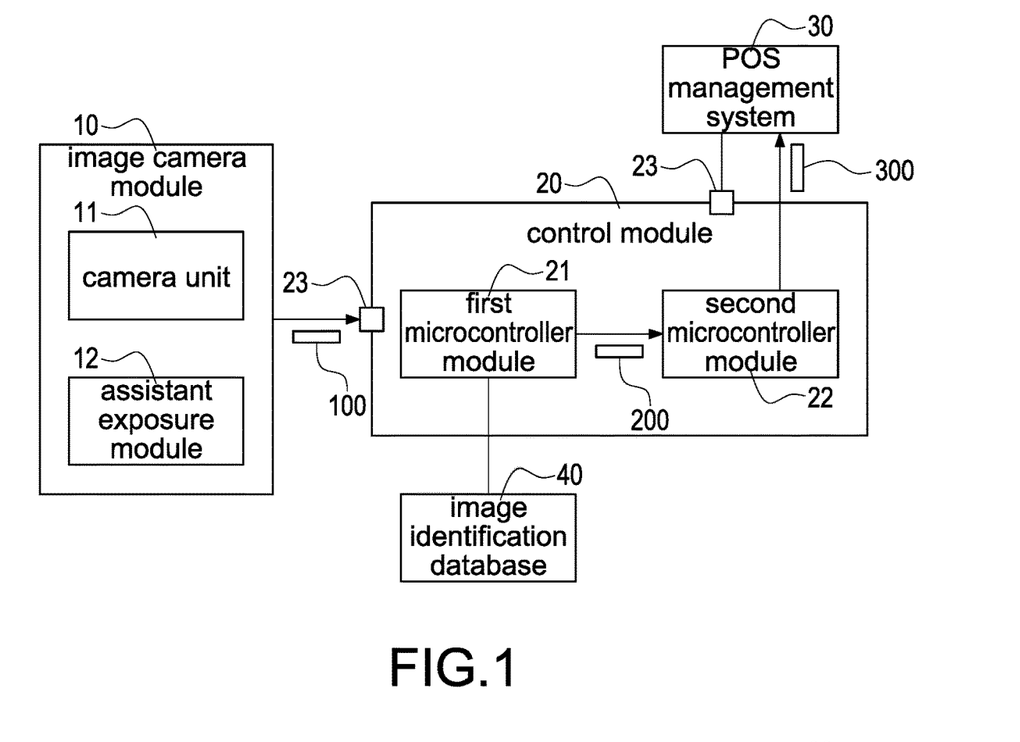
FIG. 1 is a functional block diagram of a first embodiment of a checkout apparatus for barcodeless merchandise of the present disclosure.

Please refer to FIG. 1, the FIG. 1 is a functional block diagram of a first embodiment of a checkout apparatus for barcodeless merchandise of the present disclosure. In the first embodiment of the present disclosure, the checkout apparatus for barcodeless merchandise includes an image camera module 10 and a control module 20. The image camera module 10 obtains a merchandise image 100 included barcodeless merchandise (not shown) by scanning or sensing. The image camera module 10 can perform a one-time detection method for a plurality of barcodeless merchandises at the same time, and can be performed continuously to obtain the merchandise image 100 including a plurality of barcodeless merchandises.

The image camera module 10 includes a camera unit 11 and an assistant exposure module 12. The camera unit 11 may be a light sensing element such as a CCD or a CMOS, or may further include a lens system for prime or zoom. In the first embodiment of the present disclosure, the camera unit 11 of the image camera module 10 obtains the merchandise image 100 by taking a picture. The assistant exposure module 12 may be a light emitting element such as PL (photoluminescence) or LED (light emitting diode). The camera unit 11 is disposed on a surface of the image camera module 10 that is facing to a tray for placed the barcodeless merchandise, so as to obtain the merchandise image 100 included barcodeless merchandise. The assistant exposure module 12 is arranged outside the camera unit 11 and is used to light or flash on the barcodeless merchandise for assistant exposure. A purpose of performing the assistant exposure on barcodeless merchandise is to allow the merchandise image 100 obtained by the camera unit 11 can present more details. When a light intensity irradiated to the barcodeless merchandise is insufficient, a surface of the barcodeless merchandise may has more shadows (for example, the uneven surface of bread) to cover up the surface texture. In addition, the assistant exposure module 12 may be used to automatically and instantly light on the barcodeless merchandise for assistant exposure with an illuminance sensor (not shown), or to adjust lumen value of light outputted by the assistant exposure module 12 in real time.

The control module 20 is coupled to the image camera module 10, the control module 20 receives the merchandise image 100 and generates an output datum 300 according to a result of a merchandise identification program after the control module 20 performs the merchandise identification program on the merchandise image 100. The coupling may include a physical or wired connection, and may also include wireless transmission methods such as radio waves invisible to the naked eye, and the coupling described below is also explained according to the foregoing. In the first embodiment of the present disclosure, the control module 20 may be coupled to the image camera module 10 through a USB port 23. In addition, at least one of the image camera module 10 and the control module 20 may be coupled to a POS management system 30 or is embedded in the POS management system 30. As shown in FIG. 1, when the control module 20 is not embedded in the POS management system 30, the checkout apparatus for barcodeless merchandise further includes the USB port 23, and the control module 20 is hot-swappable to the POS management system 30 through the USB port 23.

In the first embodiment of the present disclosure, the control module 20 includes a first microcontroller module 21 and a second microcontroller module 22. The first microcontroller module 21 is coupled to the image camera module 10, the first microcontroller module 21 generates a metadatum 200 according the result of the merchandise identification program after the first microcontroller module 21 performs the merchandise identification program on the merchandise image 100. And then, the second microcontroller module 22 is coupled to the first microcontroller module 21, the second microcontroller module 22 receives the metadatum 200 generated by the first microcontroller module 21 and outputs an output datum 300 converted from the metadatum 200 into the POS management system 30 for checkout processing.

In traditional meaning, the POS management system 30 is connected to a barcode scanner through a USB port or a serial port, and receives merchandise label scanned by the barcode scanner. Generally, after receiving a merchandise number, the POS management system 30 can query the internal or external database to obtain some information such as merchandise name, photo, and selling price corresponding to every merchandise and display it. Thereby, the employee of the store can check out the merchandise through the POS management system 30.

One of technical features of the present disclosure is that the checkout apparatus for barcodeless merchandise obtains the merchandise image 100 of the barcodeless merchandise through the image camera module 10, and the first microcontroller module 21 performs the merchandise identification program on the merchandise image 100 to generate the metadatum 200, the second microcontroller module 22 converts the metadatum 200 into the output datum 300 that can be directly read and processed by the POS management system 30. Therefore, after the POS management system 30 obtains the output datum 300 from the checkout apparatus for barcodeless merchandise through the USB port 23, the POS management system 30 can query the internal or external database to obtain some information such as merchandise name, photo, and selling price corresponding to the output datum 300 (for example, recorded merchandise number) and display it. Thereby, the employee of the store can check out the merchandise through the POS management system 30. In this way, the user does not need to modify the software and hardware architecture of the existing POS management system 30, but can directly use the checkout apparatus for barcodeless merchandise of the present disclosure for any store already has the POS management system 30, which is quite convenient.

In one embodiment, the first microcontroller module 21 is a single chip computer based on a Linux operating system architecture. The single chip computer may be a Raspberry Pi, and its model may be 1A type, 1A+ type, 1B type, 1B+ type, 2B type, 3B type, 3B+ type, 3A+ type or 4B type. The first microcontroller module 21 performs the merchandise identification program on the merchandise image according to an appearance of the barcodeless merchandise of the merchandise image 100. The appearance of the barcodeless merchandise may include shape, color, or size. The second microcontroller module 22 is a circuit board based on an Arduino machine code architecture.

The metadatum 200 may include a merchandise label, a merchandise name, a merchandise category, or the number of merchandises. Which means, after the first microcontroller module 21 performs the merchandise identification program on the merchandise image 100, it can distinguish merchandise name (clear and detailed, such as polo bread, tiramisu, roasted chicken legs, etc.), merchandise category (generally refers to the type of merchandise induction, such as bread, cakes, poultry, etc.), merchandise label (such as the corresponding bar code number in the POS management system) or quantity of each barcodeless merchandise in the merchandise image 100 according to the shape, color or size. It can be convenient to summarize the price and quantity corresponding to different names or label when settling the amount of the merchandise. Even discount or promotional activities (such as fresh deadline of special, different kinds of merchandise with discounts, etc.) based on merchandise category.

Further, the checkout apparatus for barcodeless merchandise further includes an image identification database 40. In the first embodiment of the present disclosure, the image identification database 40 is coupled to the control module 20, and the image identification database 40 for the first microcontroller module 21 of the control module 20 to access during the control module 20 performs the merchandise identification program on the merchandise image 100. The image identification database 40 may be a cloud server, but the present disclosure is not limited thereto. In this embodiment, after receiving the merchandise image 100, the first microcontroller module 21 may compare the merchandise image 100 with a plurality of images in the image identification database 40 to identify information such as the name, category, label, or quantity of one or more barcodeless merchandise included in the merchandise image 100.

Figure 2:
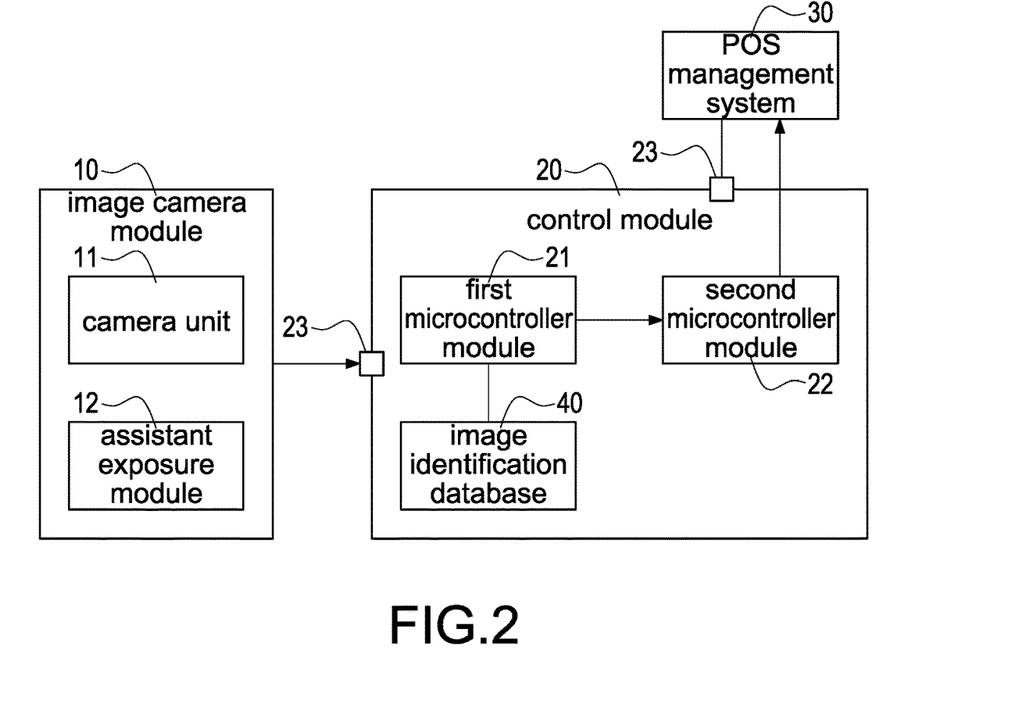
FIG. 2 is a functional block diagram of a second embodiment of the checkout apparatus for barcodeless merchandise of the present disclosure.

Please refer to FIG. 2, the FIG. 2 is a functional block diagram of a second embodiment of the checkout apparatus for barcodeless merchandise of the present disclosure. The second embodiment of the present disclosure is substantially the same as the first embodiment of the present disclosure, except that the image identification database 40 is disposed in the control module 20 and is coupled to the first microcontroller module 21. The image identification database 40 may be an EEPROM or a NAND Flash or other non-volatile storage medium.

Figure 3:
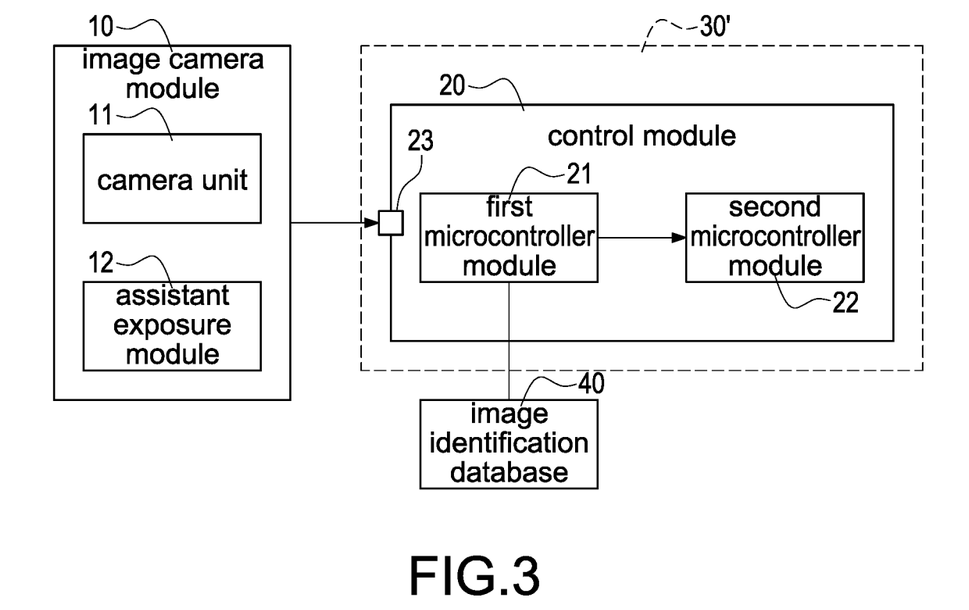
FIG. 3 is a functional block diagram of a third embodiment of the checkout apparatus for barcodeless merchandise of the present disclosure.

Please refer to FIG. 3, the FIG. 3 is a functional block diagram of a third embodiment of the checkout apparatus for barcodeless merchandise of the present disclosure. The third embodiment of the present disclosure is substantially the same as the first embodiment of the present disclosure, except that the control module 20 can be embedded in the POS management system 30', which can reduce the number of transmission ports, transmission distance and size of apparatus.

Figure 4:
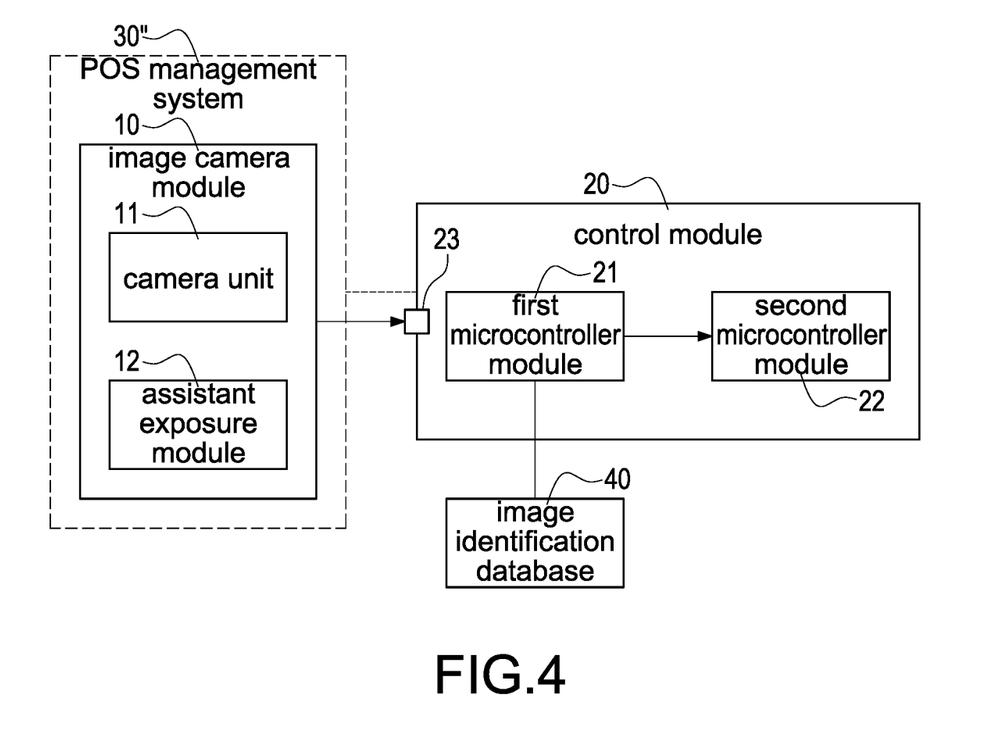
FIG. 4 is a functional block diagram of a fourth embodiment of the checkout apparatus for barcodeless merchandise of the present disclosure.

Please refer to FIG. 4, the FIG. 4 is a functional block diagram of a fourth embodiment of the checkout apparatus for barcodeless merchandise of the present disclosure. The fourth embodiment of the present disclosure is substantially the same as the first embodiment of the present disclosure, except that the image camera module 10 can be embedded in the POS management system 30", which can reduce the number of transmission ports, transmission distance and size of apparatus.

Figure 5:
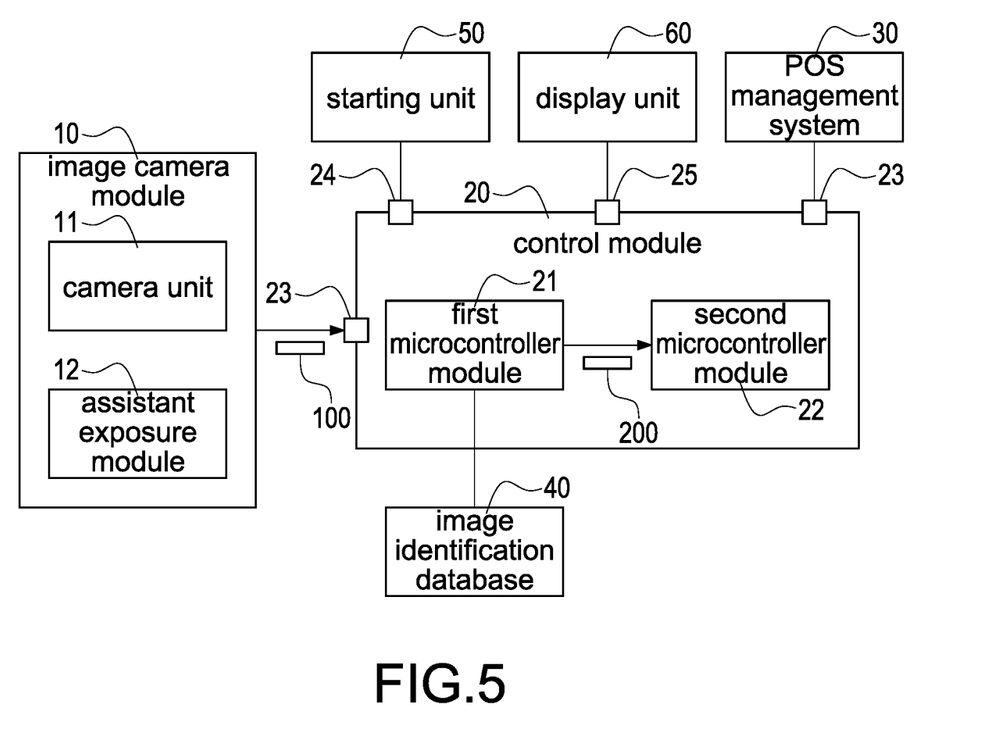
FIG. 5 is a functional block diagram of a fifth embodiment of the checkout apparatus for barcodeless merchandise of the present disclosure.

Please refer to FIG. 5, the FIG. 5 is a functional block diagram of a fifth embodiment of the checkout apparatus for barcodeless merchandise of the present disclosure. The fifth embodiment of the present disclosure is substantially the same as the first embodiment of the present disclosure, but further includes a starting unit 50 and a display unit 60. The starting unit 50 is coupled to the control module 20 through a micro USB port 24 for controlling to start or stop the image camera module 10 by the control module 20. The starting unit 50 may be a DIP switch, a button, a wrench, or a knob. The display unit 60 is coupled to the control module 20 through an HDMI port 25 and displays information of at least one of the image camera module 10 and the control module 20 (for example, the merchandise image 100 obtained by the image camera module 10, the metadatum 200 generated after the first microcontroller module 21 performs the merchandise identification program on the merchandise image 100 or the output datum 300 converted from the metadatum 200). The display unit 60 may be composed of LCD, LED, OLED, QD-OLED, mini-LED, micro-LED, IGZO or e-Paper.

Figure 6:
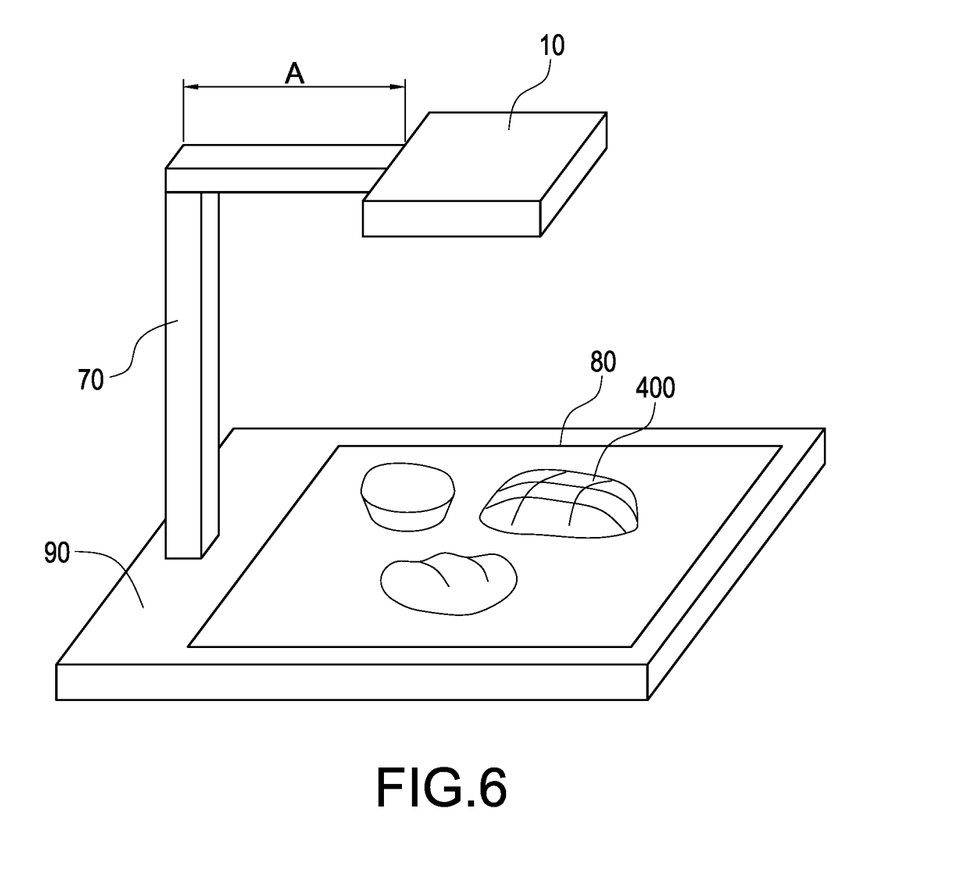
FIG. 6 is a schematic diagram of an appearance of an embodiment of the checkout apparatus for barcodeless merchandise of the present disclosure.
Figure 7:
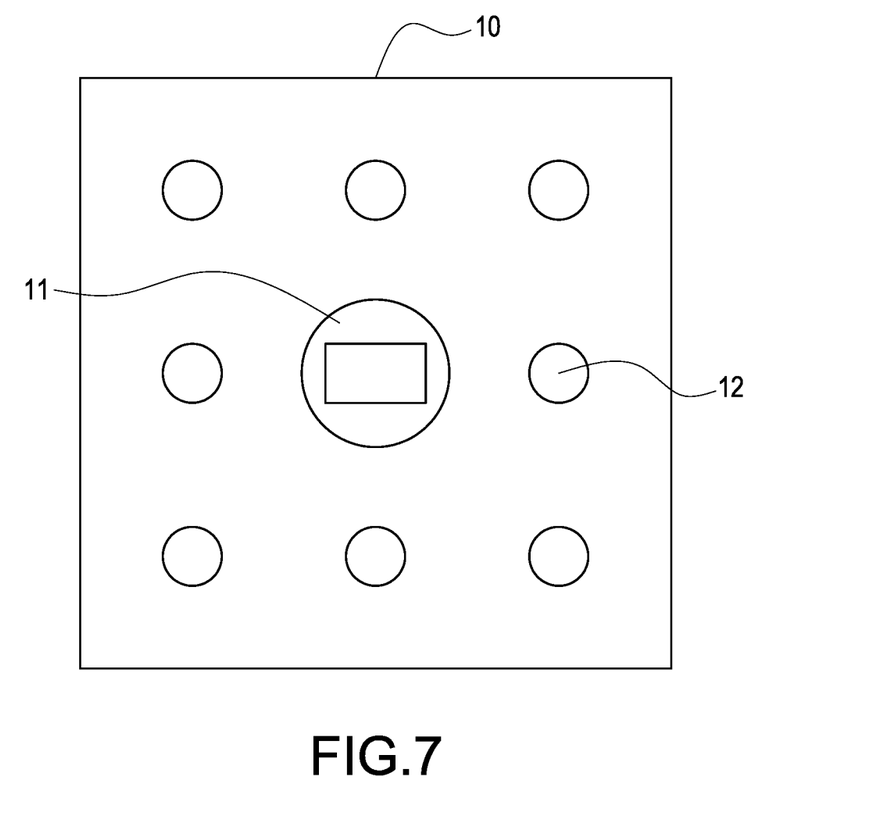
FIG. 7 is a schematic bottom view of an image camera module of the checkout apparatus for barcodeless merchandise of the present disclosure.

Please refer to FIG. 6 and FIG. 7, the FIG. 6 is a schematic diagram of an appearance of an embodiment of the checkout apparatus for barcodeless merchandise of the present disclosure, and the FIG. 7 is a schematic bottom view of an image camera module of the checkout apparatus for barcodeless merchandise of the present disclosure. The checkout apparatus for barcodeless merchandise may further include a bracket 70 and a tray 80. The tray 80 is used to removably place barcodeless merchandise 400 (such as bread or cake, etc.) as shown in FIG. 6. In particular, the user may place barcodeless merchandise on the tray 80 when the user wants to check out the barcodeless merchandise, and then removing the barcodeless merchandise from the tray 80 after the completion of the checkout for other users (e.g., buyer or cashier members) continue to use.

Further, the tray 80 is disposed on a base 90, the bracket 70 is coupled to the base 90 and supports the image camera module 10 on the tray 80, so that there is a proper distance and angle between the image camera module 10 and between the trays 80. In one embodiment of the checkout apparatus for barcodeless merchandise of the present disclosure, the length of the base 90 is 44 cm, the width is 40 cm, and the height is 2 cm. The length and width of the tray 80 may be 33 cm. The length of the bracket 70 is 28.5 cm, the width is 10 cm, and the height is 55.2. The overall length of the checkout apparatus for barcodeless merchandise is 44 cm, the width is 40 cm, and the height is 61.2 cm. The bracket 70 allows the vertical distance between the image camera module 10 and the tray 80 to be 55.2 cm, and enables an extended distance A of the image camera module 10 along the horizontal direction of the base 90 to be 30 cm. The height of the image camera module 10 along the vertical direction of the base 90 is 4 cm. As shown in FIG. 7, the camera unit 11 and the assistant exposure module 12 on a surface of the image camera module 10 that facing the tray 80, and the assistant exposure module 12 is arranged outside the camera unit 11. In the embodiment of the present disclosure, the control module 20 may be externally connected to the base 90 or embedded in the base 90.

Figure 8:
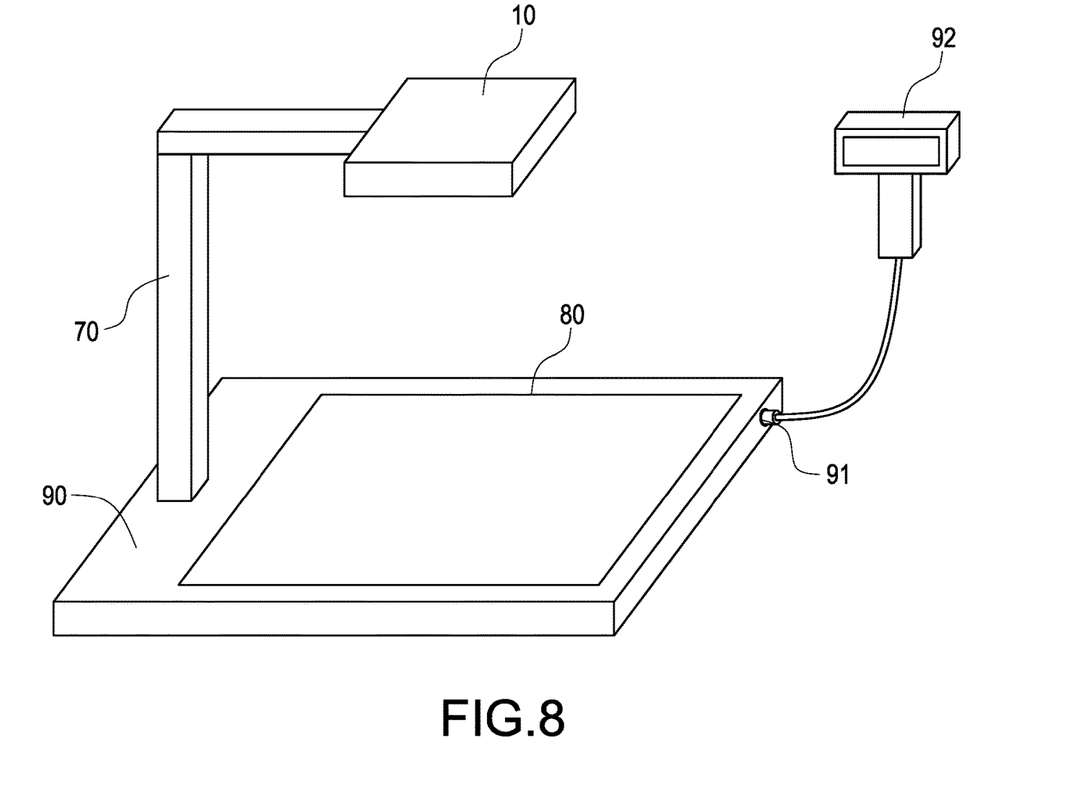
FIG. 8 is a schematic diagram of an appearance of another embodiment of the checkout apparatus for barcodeless merchandise of the present disclosure.

FIG. 8 is a schematic diagram of an appearance of another embodiment of the checkout apparatus for barcodeless merchandise of the present disclosure. It is substantially the same as the embodiment shown in FIG. 6 above, but the checkout apparatus for barcodeless merchandise further includes a scanner port 91. The scanner port 91 can be disposed on periphery of the base 90 of the image camera module 10. Each scanner port 91 is for coupling to a scanner 92, and the information obtained by the scanner 92 can be transmitted to POS management system 30 through the base 90. Further, the information obtained by the scanner 92 can be directly transmitted to the POS management system 30 through the base 90, or can be transmitted to the POS management system 30 through the control module 20 embedded in the base 90 (without going through the first microcontroller module 21 and the second microcontroller module 22). It shares the original coupling circuit between the control module 20 and the POS management system 30 to save circuit costs. The scanner 92 may be a one-dimensional barcode scanner, a two-dimensional barcode scanner, or a scanner compatible with barcodes such as Deta Matrix, PDF417, MaxiCode, VeriCode, and the like. Through the settings of the image camera module 10 and the scanner 92, the checkout apparatus of the present disclosure can facilitate the interactive use of barcode merchandise and barcodeless merchandise.

When the checkout apparatus for barcodeless merchandise of the present disclosure is used, one or more barcodeless merchandise can be scanned or sensed by the image camera module 10 to obtain the merchandise image 100 included the barcodeless merchandise. And then, after the control module 20 performs the merchandise identification program on the merchandise image 100, the control module 20 generates the output datum 300 to the POS management system 30 according to the result of the merchandise identification program. At least one of the image camera module 10 and the control module 20 is coupled to the POS management system 30 (e.g., hot-plug connection to the POS management system 30 though the USB port 23) or is embedded in the POS management system 30. The output datum 300 is readable for the POS management system 30. That is, the output datum 300 can be compatible with the POS management system 30, the POS management system 30 can directly read the output datum 300, and the merchandise identification program may identify the merchandise label, the merchandise name, the merchandise category, or the number of merchandises. For this reason, under a condition of combining the image camera module 10, the control module 20 and the POS management system 30, which can automatically perform operations of key-in and checkout for barcodeless merchandise, so as to achieve the purpose of reducing errors caused by manual operation for barcodeless merchandise at checkout terminals, reducing operating costs, and maintaining a correctness of marketing strategy of a company.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A checkout apparatus for barcodeless merchandise, the checkout apparatus coupled to a point of sales (POS) management system and comprising:
    an image camera module configured to obtain a merchandise image included barcodeless merchandise, and
    a control module coupled to the image camera module, the control module configured to receive the merchandise image and configured to generate an output datum to the POS management system according to a result of a merchandise identification program after the control module configured to perform the merchandise identification program on the merchandise image,
    wherein, at least one of the image camera module and the control module is coupled to the POS management system or is embedded in the POS management system, the output datum is readable for the POS management system,
    wherein the image camera module obtains the merchandise image by taking a picture, and the control module includes a first microcontroller module and a second microcontroller module: the first microcontroller module is coupled to the image camera module, the first microcontroller module is configured to generate a metadatum according the result of the merchandise identification program after the first microcontroller module is configured to perform the merchandise identification program on the merchandise image; the second microcontroller module is coupled to the first microcontroller module and is configured to convert the metadatum into the output datum.

2. The checkout apparatus for barcodeless merchandise in claim 1, wherein the metadatum includes a merchandise label, a merchandise name, a merchandise category, or the number of merchandises.

3. The checkout apparatus for barcodeless merchandise in claim 1, wherein the first microcontroller module is a single chip computer based on a Linux operating system architecture, the first microcontroller module is configured to perform the merchandise identification program on the merchandise image according to an appearance of the barcodeless merchandise of the merchandise image.

4. The checkout apparatus for barcodeless merchandise in claim 1, wherein the second microcontroller module is a circuit board based on an Arduino machine code architecture.

5. The checkout apparatus for barcodeless merchandise in claim 1, further comprising a display unit coupled to the control module for displaying the merchandise image obtained by the image camera module and displaying the metadatum or the output datum generated by the control module.

6. The checkout apparatus for barcodeless merchandise in claim 1, further comprising an image identification database coupled to the control module, and the image identification database for the control module to access during the control module configured to perform the merchandise identification program on the merchandise image.

7. The checkout apparatus for barcodeless merchandise in claim 1, wherein the control module includes a universal serial bus (USB) port, and the control module is hot-swappable to the POS management system through the USB port.

8. The checkout apparatus for barcodeless merchandise in claim 1, further comprising a starting unit coupled to the control module for controlling to start or stop the image camera module by the control module.

9. The checkout apparatus for barcodeless merchandise in claim 1, further comprising a bracket supporting the image camera module.

10. The checkout apparatus for barcodeless merchandise in claim 9, further comprising an assistant exposure module arranged on a surface of the image camera module or the bracket that faces the barcodeless merchandise.

11. The checkout apparatus for barcodeless merchandise in claim 1, further comprising a scanner port for coupling a scanner and transferring data obtained by the scanner to the POS management system.

12. A checkout system for barcodeless merchandise comprising:
    a point of sales (POS) management system,
    an image camera module configured to obtain a merchandise image included barcodeless merchandise, and
    a control module coupled to the image camera module, the control module configured to receive the merchandise image and configured to generate an output datum to the POS management system according to a result of a merchandise identification program after the control module configured to perform the merchandise identification program on the merchandise image,
    wherein, at least one of the image camera module and the control module is coupled to the POS management system or is embedded in the POS management system, the output datum is readable for the POS management system,
    wherein the image camera module obtains the merchandise image by taking a picture, and the control module includes a first microcontroller module and a second microcontroller module: the first microcontroller module is coupled to the image camera module, the first microcontroller module is configured to generate a metadatum according the result of the merchandise identification program after the first microcontroller module is configured to perform the merchandise identification program on the merchandise image; the second microcontroller module is coupled to the first microcontroller module and is configured to convert the metadatum into the output datum.

13. The checkout system for barcodeless merchandise in claim 12, wherein the metadatum includes a merchandise label, a merchandise name, a merchandise category, or the number of merchandises.

* * * * *